United States Patent [19]

Jacobs et al.

[11] Patent Number: 5,863,961
[45] Date of Patent: Jan. 26, 1999

[54] FLEXIBLE POLYURETHANE FOAMS AND A PROCESS FOR THE PRODUCTION THEREOF

[75] Inventors: Gundolf Jacobs, Rösrath; Peter Haas, Haan, both of Germany

[73] Assignee: Bayer Aktiengesellschaft, Leverkusen, Germany

[21] Appl. No.: 95,201

[22] Filed: Jun. 10, 1998

Related U.S. Application Data

[62] Division of Ser. No. 976,929, Nov. 24, 1997, Pat. No. 5,814,676.

[30] Foreign Application Priority Data

Dec. 2, 1996 [DE] Germany ............... 196 49 829.5

[51] Int. Cl.⁶ .................... C08G 18/32; C08G 18/48
[52] U.S. Cl. ................................. 521/174; 521/914
[58] Field of Search ................................ 521/174, 914

[56] References Cited

U.S. PATENT DOCUMENTS

| 4,008,189 | 2/1977 | van Leuwen et al. | 260/2.5 AD |
|---|---|---|---|
| 5,063,253 | 11/1991 | Gansen et al. | 521/174 |
| 5,145,882 | 9/1992 | Samaritter | 521/155 |
| 5,478,494 | 12/1995 | Lee et al. | 521/174 |
| 5,686,500 | 11/1997 | Fishback et al. | 521/174 |
| 5,770,635 | 6/1998 | Lee et al. | 521/174 |

FOREIGN PATENT DOCUMENTS 2088414  4/1993  Canada .

*Primary Examiner*—Morton Foelak
*Attorney, Agent, or Firm*—Joseph C. Gil; N. Denise Brown

[57] ABSTRACT

Process for the production of flexible polyurethane foams by reacting
A) polyisocyanates or polyisocyanate prepolymers, with
B) a specific blend of isocyanate-reactive compounds,
C) water,
D) optionally, blowing agents,
E) optionally, activators, stabilizers and other per se known additives.

The specific blend of isocyanate-reactive compounds B) comprises:
  i) at least one polyether polyol of a functionality of more than 2.5 to 6.0,
  ii) at least one polyether polyol of a functionality of 1.8 to less than 2.5,
  iii) at least one polyether polyol of a functionality of 1.8 to 6.0 having an EO content in the polyether chain of at least 50 wt. %.

The flexible foams produced according to the present invention are characterized by moderate compressive strength at an elevated bulk density.

2 Claims, No Drawings

5,863,961

FLEXIBLE POLYURETHANE FOAMS AND A PROCESS FOR THE PRODUCTION THEREOF

This is a divisional application of Ser. No. 08/976,929 now U.S. Pat. No. 5,814,676 filed Nov. 24, 1997.

BACKGROUND OF THE INVENTION

There are essentially two major groups of flexible foams which are of industrial significance. These are, on the one hand, flexible polyurethane foams and, on the other, latex foams. Both of these types of flexible foams have a similar range of uses.

Nonetheless, there are differences in production, starting points and mechanical properties between the two types of flexible foams.

Flexible latex foams thus have a somewhat different profile of the compressive strength curve as assessed by DIN 53 577 or ISO 3386, parts 1 and 2. The flexible latex foams do not exhibit a marked plateau in compressive strength, but, in comparison with flexible polyurethane foams, instead exhibit a continuous increase in compressive strength as compression increases.

It is precisely this property, i.e. a continuous increase in compressive strength as compression increases, which is desired for certain applications.

Thus, an object of the present invention was to influence the compressive strength/compression profile of flexible polyurethane foams in such a manner that behavior similar or identical to that of flexible latex foams is achieved. Another object was to produce flexible polyurethane foams wherein a mid-range compressive strength of between 2.5 and 4.0 kPa is achieved.

It has now been found that such a curve profile of flexible polyurethane foams may be established by polyol components of differing functionality, i.e. di- and more highly functional polyether polyols having a differing chain structure, without causing increased residual deformation of the foam. Moderate compressive strength values are achieved simultaneously at relatively high bulk densities.

SUMMARY OF THE INVENTION

The present invention provides a process for the production of flexible polyurethane foams by reacting A) at least one polyisocyanate component or a prepolymer thereof, with B) an isocyanate-reactive component comprising:
  i) at least one polyether polyol having a functionality of more than 2.5 to 6, and containing at least 75% by weight of propylene oxide in the EO/PO chain,
  ii) at least one polyether polyol having a functionality of 1.8 to less than 2.5, and containing at least 75% by weight of propylene oxide in the EO/PO chain, and
  iii) at least one polyether polyol having a functionality of 1.8 to 6.0 and containing at least 50% by weight of ethylene oxide in the EO/PO chain; and C) water.

In addition, D) one or more blowing agent, and E) additives such as, for example, stabilizers, activators, etc. may also be present.

It is preferred, in the process of the present invention, that component B)i) contain from 75 to 90% by weight of propylene oxide in the EO/PO chain. It is also preferred that component B)ii) contain from 75 to 90% by weight of propylene oxide in the EO/PO chain. In addition, component B)iii) preferably contains from 60 to 90% by weight of ethylene oxide in the EO/PO chain.

Blowing agents D) include any of the conventional known blowing agents which are typically used in the production of flexible polyurethane foams. These blowing agents include compounds such as, for example, hydrofluoroalkanes; or alkanes such as, for example, pentane, i-pentane or cyclopentane; or liquid carbon dioxide.

Surprisingly, it has been found that the desired compression profile, i.e. similar to that of flexible latex foam, is achieved by this particular combination of polyethers. Furthermore, these linear components do not result in an increase in compressive deformation of the resultant flexible polyurethane foams.

The isocyanate-reactive components are typically used in amounts such that there is from 15 to 70% by weight of B)i), from 30 to 80% by weight of B)ii), and from 3 to 15% by weight of B)iii), relative to 100 parts by weight of isocyanate-reactive component B).

The isocyanate starting components which are suitable for the present invention include, for example, aromatic di- and poly-isocyanates, prepolymers thereof, and mixtures thereof. It is preferred that the polyisocyanate component be an aromatic polyisocyanate such as, for example, tolylene diisocyanate and/or diphenylmethane diisocyanate, mixtures thereof and/or prepolymers thereof. It is more preferred that these polyisocyanates be modified by urea groups, biuret groups, allophanate groups, carbodiimide groups, and/or uretidione groups.

In accordance with the present invention, one or more of the following objectives may simultaneously achieved:

linear rise in compressive strength, elevated bulk density, low compressive strength, low compressive deformation, low moist ageing, and elevated proportion of open cells.

By contrast, such properties are often mutually opposing in previously known flexible polyurethane foams.

Suitable starting materials for the isocyanate-reactive component include, for example, polyether polyols, polyester polyols, etc. Polyether polyols may be obtained, for example, by the addition of one or more alkylene oxides such as, for example, ethylene oxide and/or propylene oxide, onto one or more polyfunctional starter compounds such as, for example, ethylene glycol, propylene glycol, trimethylolpropane, sorbitol, sugar, ethylenediamine or mixtures thereof. Polyester polyols may be obtained, for example, by the condensation of one or more dicarboxylic acids with predominantly difunctional hydroxy components.

Suitable additives E) for the present invention include, for example, foam stabilizers, catalysts, cell regulators, reaction inhibitors, plasticizers, fillers, etc.

Foam stabilizers E) which may be considered suitable for the process of the present invention include, for example, polyether siloxanes, and preferably those which are insoluble in water. Compounds such as these are generally of such a structure that a relatively short chain copolymer of ethylene oxide and propylene oxide is attached to a polydimethylsiloxane residue. Such foam stabilizers are described in, for example, U.S. Pat. Nos. 2,834,748, 2,917, 480 and 3,629,308, the disclosures of which are herein incorporated by reference.

Catalysts E) suitable for the present invention include those which are known per se in the field of flexible polyurethane foams. These catalysts include, for example, tertiary amines, such as triethylamine, tributylamine, N-methylmorpholine, N-ethylmorpholine, N,N,N',N'-tetramethylethylenediamine, pentamethyl-diethylenetriamine and higher homologues (as described in, for example, DE-A 2,624,527 and 2,624,528), 1,4-diazabicyclo[2.2.2]octane, N-methyl-N'-dimethyl-aminoethylpiperazine, bis-(dimethylaminoalkyl) piperazines, N,N-dimethylbenzylamine, N,N-dimethylcyclohexylamine, N,N-diethyl-benzylamine, bis-(N,N-diethylaminoethyl) adipate, N,N,N',N'-tetramethyl-1,3-butanediamine, N,N-dimethyl-β-phenylethylamine, 1,2-dimethylimid-azole, 2-methylimidazole, monocyclic and bicyclic amines together with bis-(dialkylamino)alkyl ethers, such as 2,2-bis-(dimethylaminoethyl) ether.

Other suitable catalysts E) which may be used in the present invention include, for example, organometallic compounds, and particularly, organotin compounds. Organotin compounds which may be considered suitable include those organotin compounds containing sulfur. Such catalysts include, for example, di-n-octyltin mercaptide. Other types of suitable organotin catalysts include, preferably tin(II) salts of carboxylic acids such as, for example, tin(II) acetate, tin(II) octoate, tin(II) ethylhexoate and/or tin(II) laurate, and tin(IV) compounds such as, for example, dibutyltin oxide, dibutyltin dichloride, dibutyltin diacetate, dibutyltin dilaurate, dibutyltin maleate and/or dioctyltin diacetate.

Further examples of suitable additives, component E), which may optionally be include in the present invention can be found in *Kunststoff-Handbuch*, volume VII, edited by Vieweg & Höchtlen, Carl Hanser Verlag, Munich 1993, 3$^{rd}$ edition, pp. 104 to 127, for example. These additives include (but are not limited to) foam stabilizers and cell regulators, reaction inhibitors, stabilizers, flame retardant substances, plasticizers, dyes, and fillers, together with fungistatic and bacteriostatic substances. The relevant details concern specific details as to the use and mode of action of these additives is set forth in the above reference.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Polyol 1: a polyether polyol having an OH number of 46 and containing predominantly secondary OH groups, produced by addition of 10% by wt. of ethylene oxide and 90% by wt. of propylene oxide onto a starter mixture of 90% by wt. of glycerol and 10% by wt. of propylene glycol.

Polyol 2: a polyether polyol having an OH value of 56, produced by addition of propylene oxide onto propylene glycol.

Polyol 3: a polyether polyol having an OH value of 36 and containing predominantly primary OH groups, produced by addition of 70% by wt. of ethylene oxide and 30% by wt. of propylene oxide onto glycerol as a starter.

Polyol 4: a polyether polyol having an OH value of 28 and containing predominantly primary OH groups, produced by addition of 85% by wt. of propylene oxide and 15% by wt. of ethylene oxide onto trimethylolpropane as a starter.

Polyisocyanate 1: an isocyanate mixture consisting of 80% by wt. of 2,4-tolylene diisocyanate and 20% by wt.of 2,6-tolylene diisocyanate.

Polyisocyanate 2: an isocyanate mixture consisting of 65% by wt. of 2,4-tolylene diisocyanate and 35% by wt.of 2,6-tolylene diisocyanate.

In accordance with the invention, flexible polyurethane foams were produced as follows: all of the reactants/components of each the foam formulation (set forth individually for each example) were reacted using the conventional method for the production of slabstock foams at a rate of 30 kg/min on a UBT plant supplied by Hennecke, D-53754 Birlinghoven.

Example 1

Flexible foam formulation for Example 1:

| Component: | |
|---|---|
| Polyol 1 (component Bi) | 52 |
| Polyol 2 (component Bii) | 40 |
| Polyol 3 (component Biii) | 8.0 |
| Stabilizer OS 20 (Bayer AG) | 0.8 |
| Dimethylaminoethanol | 0.2 |
| Desmorapid PV (Bayer AG) | 0.1 |
| Tin 2-ethylhexoate | 0.16 |
| Water | 2.0 |
| Isocyanate 1 | 29.1 |
| Isocyanate Index | 108 |

TABLE 1

| Physical Properties for Foam of Example 1 | |
|---|---|
| Property | |
| Bulk density | 45 kg/m$^3$ |
| Tensile strength | 98 kPa |
| Elongation at break | 200% |
| Compressive strength, 40% | 3.1 kPa |
| Compression set at 90% compression | 1.8% |

The compressive strength curve (according to DIN 53 577) of this flexible foam did not exhibit the usual plateau in the range from 5 to 15% compression. Instead, there is a continuous rise in the compressive strength curve with virtually no plateau. Accordingly, the compressive strength curve of this foam is similar to that of latex foams.

Example 2

Flexible foam formulation for Example 2:

| Component: | |
|---|---|
| Polyol 1 (component Bi) | 22 |
| Polyol 2 (component Bii) | 70 |
| Polyol 3 (component Biii) | 8.0 |
| Stabilizer OS 20 (Bayer AG) | 0.8 |
| Dimethylaminoethanol | 0.2 |
| Desmorapid PV (Bayer AG) | 0.1 |
| Tin 2-ethylhexoate | 0.22 |
| Water | 2.0 |
| Isocyanate 1 | 14.8 |
| Isocyanate 2 | 14.8 |
| Isocyanate Index | 108 |

TABLE 2

Physical Properties for Foam of Example 2

| Property | |
|---|---|
| Bulk density | 45 kg/m$^3$ |
| Tensile strength | 128 kPa |
| Elongation at break | 420% |
| Compressive strength, 40% | 3.0 kPa |
| Compression set at 90% compression | 3.6% |

The compressive strength curve (according to DIN 53 577) of this flexible foam did not exhibit the usual plateau in the range from 5 to 15% compression. Instead, there is a continuous rise in the compressive strength curve with virtually no plateau. Accordingly, the compressive strength curve of this foam is similar to that of latex foams.

Example 3

Flexible foam formulation for Example 3:

| Component: | |
|---|---|
| Polyol 4 (component Bi) | 52 |
| Polyol 2 (component Bii) | 40 |
| Polyol 3 (component Biii) | 8.0 |
| Stabilizer OS 20 (Bayer AG) | 0.8 |
| Dimethylaminoethanol | 0.2 |
| Catalyst A1 (Air Products) | 0.1 |
| Tin 2-ethylhexoate | 0.26 |
| Water | 2.0 |
| Isocyanate 1 | 13.8 |
| Isocyanate 2 | 13.8 |
| Isocyanate Index | 108 |

TABLE 3

Physical Properties for Foam of Example 3

| Property | |
|---|---|
| Bulk density | 44 kg/m$^3$ |
| Tensile strength | 120 kPa |
| Elongation at break | 390% |
| Compressive strength, 40% | 3.6 kPa |
| Compression set at 90% compression | 2.5% |

The compressive strength curve (according to DIN 53 577) of this flexible foam did not exhibit the usual plateau in the range from 5 to 15% compression. Instead, there is a continuous rise in the compressive strength curve with virtually no plateau. Accordingly, the compressive strength curve of this foam is similar to that of latex foams.

The foams produced in accordance with the present invention have a good proportion of open cells in all zones, together with moderate compressive strength at an elevated bulk density. Compression set at 90% compression is low, and moist ageing values are surprisingly low. However, these flexible foams may be classified as relatively soft, due to their compressive strength of approx. 3 kPa (at 40% compression).

As a result, these foams are suitable as the resilient foam component in the production of high quality mattresses and overlay materials, such as for example mattresses having a spring core or pocketed spring core.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A flexible polyurethane foam produced by the process comprising reacting:
   A) at least one polyisocyanate or a prepolymer thereof;
   B) an isocyanate-reactive component comprising:
      i) at least one polyether polyol having a functionality of more than 2.5 to 6, and containing at least 75% by weight of propylene oxide in the EO/PO chain,
      ii) at least one polyether polyol having a functionality of 1.8 to less than 2.5, and containing at least 75% by weight of propylene oxide in the EO/PO chain, and
      iii) at least one polyether polyol having a functionality of 1.8 to 6.0 and containing at least 50% by weight of ethylene oxide in the EO/PO chain; and
   C) water said foam being characterized by a compressive strength in the range of from 2.5 to 4.0 kPa.

2. A flexible polyurethane foam produced by the process comprising reacting:
   A) at least one polyisocyanate or a prepolymer thereof;
   B) an isocyanate-reactive component comprising:
      i) at least one polyether polyol having a functionality of more than 2.5 to 6, and containing at least 75% by weight of propylene oxide in the EO/PO chain,
      ii) at least one polyether polyol having a functionality of 1.8 to less than 2.5, and containing at least 75% by weight of propylene oxide in the EO/PO chain, and
      iii) at least one polyether polyol having a functionality of 1.8 to 6.0 and containing at least 50% by weight of ethylene oxide in the EO/PO chain; and
   C) water, said foam being characterized by a bulk density of 35 to 65 kg/m$^3$.

\* \* \* \* \*